United States Patent [19]
Williams

[11] 3,728,622
[45] Apr. 17, 1973

[54] METHOD OF AND APPARATUS FOR MEASURING IN SITU THE FORMATION FACTOR

[76] Inventor: Cecil E. Williams, 2753 Peter St., Honolulu, Hawaii 96816

[22] Filed: Sept. 28, 1971

[21] Appl. No.: 184,446

[52] U.S. Cl..................................324/9, 324/62
[51] Int. Cl. ..................................G01v 3/06
[58] Field of Search........................324/1, 3, 4, 9, 10, 324/64, 65, 62; 340/4 E

[56] References Cited

UNITED STATES PATENTS

| | | | |
|---|---|---|---|
| 3,214,728 | 10/1965 | Higgins | 340/4 E |
| 2,839,721 | 6/1958 | Witte | 324/10 X |
| 3,105,191 | 9/1963 | Schopper | 324/10 |
| 3,405,351 | 10/1968 | Schuster | 324/10 |

*Primary Examiner*—Gerard R. Strecker
*Attorney*—Edwin A. Oser

[57] ABSTRACT

A method of and apparatus for measuring in situ the formation factor is disclosed. The formation factor is the ratio of the resistivity of a water saturated sediment to the resistivity of the interstitial water of the sediment. To this end the sediment is insulated from the water by an insulating sheet provided with a circumferential electrode and two opposed electrodes disposed on opposite surfaces of the sheet. By applying an alternating current between these three electrodes the ratio of the resistivity between the electrode in contact with the sediment and the circumferential or counter electrode on the one hand and the resistivity between the opposed electrode in contact with the water and the counter electrode may be measured. This may conveniently be effected by a Wheatstone bridge to which an alternating current is applied. The bridge may be balanced by adjusting one of the resistors thereby to measure the ratio of the resistance of the sediment to the resistance of the water. The electrode arrangement may be modified to form in essence a sled which may be moved by a boat or a ship across the water-sediment interface.

13 Claims, 6 Drawing Figures

INVENTOR.
Cecil E. Williams
BY
Attorney

METHOD OF AND APPARATUS FOR MEASURING IN SITU THE FORMATION FACTOR

BACKGROUND OF THE INVENTION

This invention relates generally to the measurement of the formation factor and particularly relates to a method of and apparatus for measuring directly the ratio of the resistivity of the sediment to that of water at the water-sediment interface.

The formation factor is defined as the ratio of electrical resistivity of a saturated sediment to the resistivity of water occupying the interstices of the sediment. The water may be either fresh water or ocean water, that is salt water. Thus, it is possible to measure the formation factor, for example, in a river, a fresh-water lake, or the ocean.

Knowledge of the formation factor is of interest in many different fields. For example, the formation factor may be used as a prospecting tool to locate mineral deposits, such for example, as tin. It may be used for pollution studies to determine changes which may be caused by industrial waste and the like. It is also of interest for structural purposes where it may be desired to build bridges or other structures in the water. Finally, the formation factor is of interest to fishermen and may, for example, indicate the type of clams to be expected on a certain surface or it may be of use for fishermen trying to catch flat fish, shrimp, or lobsters by means of a trawl net. For most of these purposes, what is of primary interest is the composition of sedimentary layers in the top thirty centimeters of the sea bottom, although for structural purposes it may be necessary to acquire knowledge of much deeper layers.

A fairly voluminous literature exists on the measurement of the formation factor which is of great interest to those concerned with oil wells. The literature also has described the effects of ion concentration, surface films which may be caused by the deposition of ions, and temperature upon electrode potentials. Due to these factors it will be evident that the resistivity of sea water or of wet sediment cannot be measured by simply applying a direct-current voltage to a pair of electrodes. As indicated, this is due to the deposition of metal or other ions which may be contained in the sea water or fresh water or the evolution of gas.

Particularly, the electrode surface effects are reduced when alternating currents are used for the measurement. Thus, if the polarity of the current is reversed at sufficiently high frequencies, and if a low current density is used at the surface of electrodes, these effects are minimized.

To this end various electrode arrangements have been devised in the past either for measuring the formation factor in an oil well or else for measuring the conductivity of the sediment which has been removed from the sea bottom in the form of a core. Thus, it has been proposed to use four electrodes arranged in line to which a direct current is applied. This is sometimes referred to as a Wenner electrode arrangement. In this case the outer two electrodes are the current electrodes and are connected to the direct current source. The inner two electrodes are used to measure the potential resulting from the applied current.

However, it has been found that local chemical action between the potential electrode material and the electrolyte may introduce error. This electrode contact problem may be reduced by rapidly reversing the polarity of the direct current.

A four-electrode conductivity measuring system has been used for sea water use. In this case a chopped direct current is applied to the electrodes. The four electrodes are ring shaped and are spaced within a glass tube. A similar arrangement has been used for measuring the formation factor of cores which have been removed from the sea bottom, for example from the Bering Sea.

However, it will be evident that none of these electrode arrangement can be used directly for the purpose of measuring the formation factor at the interface between the sediment and sea water or fresh water. Thus, none of these instruments permit to measure in situ the formation factor at the interface between water and the sediment.

It is accordingly an object of the present invention to provide a method of and apparatus for measuring the formation factor in situ at the interface of water and a sediment.

A further object of the present invention is to provide apparatus for measuring the formation factor directly by measuring the ratio of resistivity of the sediment to the water.

Another object of the present invention is to provide apparatus which may be dragged across the floor of an ocean, lake, or river for automatically measuring the formation factor.

SUMMARY OF THE INVENTION

In accordance with the present invention there is provided apparatus for measuring in situ the formation factor at the interface of water and a sediment. The water may be salt water or fresh water, the latter, of course, having a much larger resistance. The apparatus comprises an insulating member of elongated shape. For example, the member may be circular or generally of U shape. A first counter electrode is provided which surrounds at least a portion of the circumference of the member. A second electrode is disposed on one surface of the member and is arranged to be in contact with the water. A third electrode is disposed on the opposite surface of the member and is adapted to be in contact with the sediment to be measured. Finally, there is provided apparatus for measuring the ratio of the resistance between the first and the third electrode on the one hand and that between the first and the second electrode on the other hand. The apparatus includes an electronic oscillator for impressing an alternating current on the respective electrodes. In this manner the formation factor may be directly determined.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
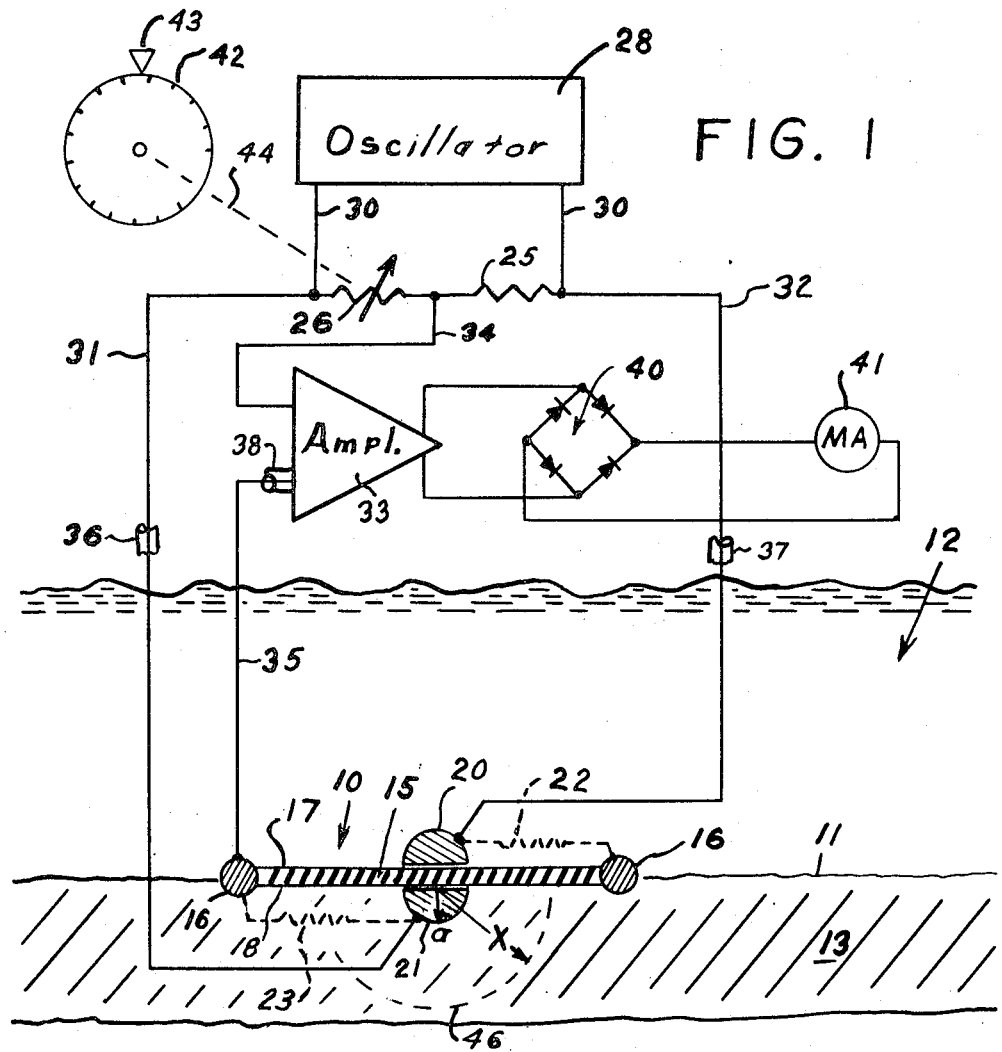
FIG. 1 is a schematic view and cross section through a body of water and the sediment below the water and illustrates the electrode arrangement of the present invention as well as schematically the apparatus for measuring the formation factor in accordance with the present invention.
Figure 2:
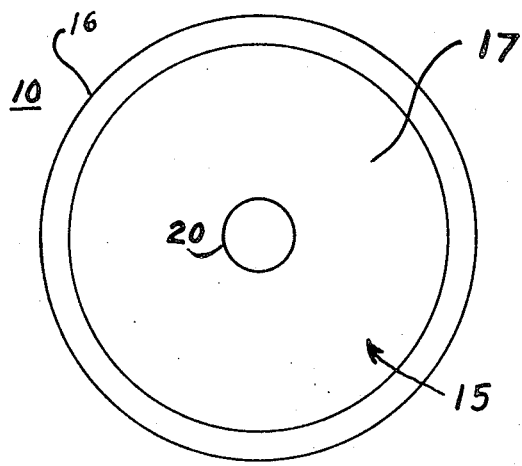
FIG. 2 is a plan view of the electrode arrangement of the invention.

Referring now to the drawings, wherein like elements are designated by the same reference characters and particularly to FIGS. 1 and 2, there is illustrated an electrode arrangement 10 which may rest on the interface 11 between a body of water 12 and a sediment 13 to be measured. The electrode arrangement 10 includes an insulating disk 15 which may assume a circular shape as shown in FIGS. 1 and 2. The insulating disk 15 should have an electrical conductivity which is appreciably less than that of the water 12 or of the sediment 13. It may consist of any suitable insulating or plastic material such as teflon, nylon or lucite or it may consist of methyl-methacrylate. Alternatively, it may consist of a concrete slab or the like.

The insulating disk 15 is provided with a counter electrode 16 which may simply consist of a conductive, circumferential ring or tubing such, for example, as copper.

Figure 5:
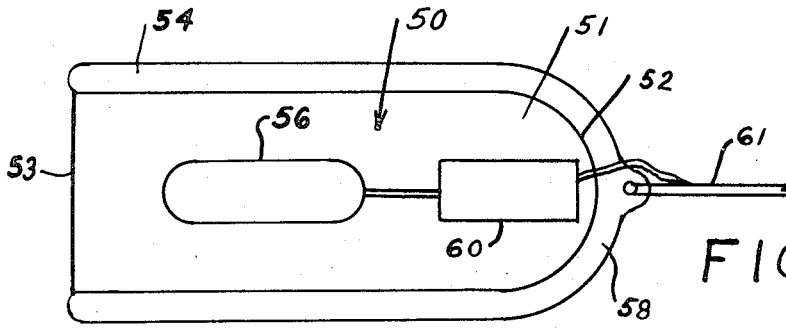
FIG. 5 is a top plan view of a modified electrode arrangement and instrument adapted to be pulled across the floor of a body of water.
Figure 6:
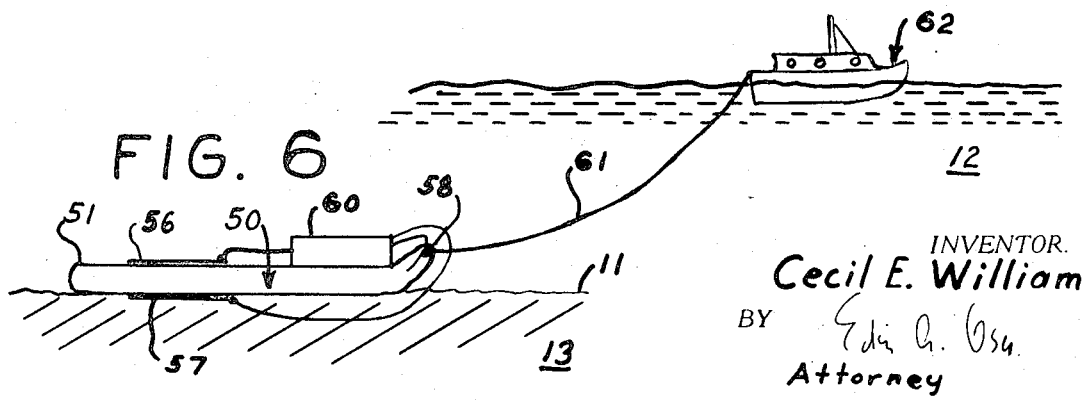
FIG. 6 is a schematic cross section of the water and its sediment and illustrating the electrode arrangement of FIG. 5 and a boat for pulling the electrode arrangement across the bottom of the water.

The disk 15 has two opposed surfaces 17 and 18. On the surface 17 is provided a second electrode 20 while the opposed surface 18 bears another electrode 21. The electrodes 20 and 21 are preferably of symetrical shape. As shown in FIG. 1 they are generally hemispherical. However, it should be noted that neither the size nor the shape of the electrodes 20 and 21 is in any way critical. Thus, as explained hereinafter in connection with FIGS. 5 and 6, electrodes 20 and 21 may be essentially flat or else they may extend or project respectively into the water 12 or the sediment 13.

In order to measure the ratio of the resistivity between the electrodes 21 and 16 on the one hand, and between electrodes 20 and 16 on the other hand there may be provided an electronic system shown schematically in FIG. 1. Thus, the resistance of the water which may be designated $R_w$ is indicated in dotted lines at 22. This is simply the resistance between electrodes 20 and 16. On the other hand the resistance of the sediment which may be designated $R_s$ is indicated in dotted lines by the resistor 23 and this is the resistance between electrodes 21 and 16.

Thus, the ratio of the desired resistances may be measured by a Wheatstone bridge including a fixed resistor 25 and a variable resistor 26. These resistors may be designated respectively $R_2$ and $R_1$ and accordingly the formation factor F is simply determined by the following formula:

$$F = R_1/R_2 = R_s/R_w \qquad (1)$$

There is also provided an electronic oscillator 28 which applies an alternating current by leads 30, to a lead 31 interconnecting electrode 21 and resistor 26 and to a lead 32 interconnecting electrode 20 and resistor 25. The voltage existing between the junction of resistors 25 and 26 and the electrode 16 may be amplified by an amplifier 33. The input of the amplifier includes a lead 34 connected to the junction point between resistors 25 and 26 and a lead 35 connected to the electrode 16. It will be understood that the leads 31, 32 and 35 which are connected to the three electrodes 21, 20 and 16 respectively are suitably insulated as indicated at 36, 37 and 38.

It will be noted that the input of the amplifier 33 should have an impedance which is larger than that of either the resistor 22 or 23. Thus, the amplifier should have a high input impedance particularly where the water 12 is fresh water which has a high resistance. Suitably, the amplifier 33 may be an operational amplifier characterized by a high input impedance and low output impedance and a stable gain.

The output of the amplifier 33 is an alternating current indicating the unbalance of the Wheatstone bridge consisting of resistors 22, 23 and 25, 26. This output alternating current may be impressed on a full wave rectifier 40 which may consist as shown of four interconnected rectifiers. Opposite corners of the full-wave rectifier 40 may be connected to a suitable null meter such as a milliampere meter 41 shown or a galvanometer.

The apparatus of the invention is operated in the following manner. The electrode arrangement 10 is deposited on or pulled across the interface 11 and may rest over a portion of the sediment, the formation factor of which is to be determined. The null meter 41 is now read and the resistor 26 is adjusted until there is no longer any output current as determined by the meter 41 indicating that the bridge is balanced.

Preferably, the adjustment of the resistor 26 may be read off on a dial 42 having a pointer 43, the mechanical connection between resistor 26 and dial 42 being shown by the dotted line 44. The dial 42 may be directly calibrated in the formation factor in accordance with Formula (1).

If it should be desired to determine directly the resistance $R_s$ this may be effected as follows:

In this case the resistor 22 which is $R_w$ may be replaced by a fixed resistor of known value. Now the resistance of resistor 23 can be directly determined by the Wheatstone bridge, the value of three arms thereof being known. The detector shown in FIG. 1 is of a well known and simple kind. However, it is feasible to provide a phase sensitive detector which will indicate whether the ratio of resistors 23 and 22 is greater than or smaller than a predetermined value. In other words a phase sensitive detector permits to indicate the direction of deviation of the bridge. Furthermore, it is feasible to provide an automatic null-following circuit which is self balancing. Such a circuit may provide a feedback between the output of the meter 41 and the adjustment of the resistor 26. This may be effected either mechanically or electronically. In the latter case a resistor may be selected which is electronically variable. Such a self-balancing circuit has the advantage that it is not necessary to manually adjust the value of resistor 26. Both of these detectors are well known in the art and form no part of the present invention.

It is also feasible to check the calibration of the instrument by lifting the electrode arrangement 10 from the interface 11 so that both electrodes 20 and 21 are in water. In that case the formation factor should be exactly one unless the instrument is out of adjustment.

The shunt capacitance which may result from the sea water surrounding the leads 31, 32 and 35 and their insulation, may normally be neglected. This is assuming that the shunt reactance is at least ten times the value of $R_s$, that is the value of resistor 23.

Figure 3:
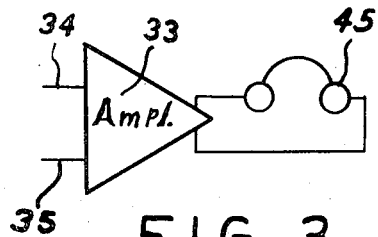
FIG. 3 illustrates in block form a modification of the apparatus for measuring whether the Wheatstone bridge included in the apparatus of FIG. 1 is balanced.

Instead of utilizing a full wave rectifier 40 and null meter 41, it is also feasible to provide a pair of head phones as shown in FIG. 3. Here head phones 45 are shown connected directly to the output of amplifier 33. In this case the head phones will indicate by a tone whether or not the Wheatstone bridge is balanced.

The circuit of FIG. 1 has been shown to operate well with an oscillator output frequency of 20 KHz which supplies a voltage of 1.8 volts to the two electrodes 20 and 21. By way of example, the resistance of resistor 25 may amount of 82 ohms and that of resistor 26 to about 500 ohms. The null meter 41 may have a range of 50 microamperes.

With the instrument of FIGS. 1 and 2 a formation factor F in various sediments has been measured along the shoreline of Narrangansett Bay and southern Rhode Island in ocean waters. These measurements are summarized below:

$F = 4.0$ to 5.7 for wave packed sand, with trace of silt.

$F = 3.3$ to 3.8 in loosely deposited coarse sand.

$F = 2.6$ to 3.4 in wave packed pebbles, 3 to 10 mm. diameter.

$F = 2.9$ to 3.5 in fine sand in 3 meters of sea water.

$F = 2.0$ to 2.6 in silty sand deposits below wave action.

It should be noted that an empirical equation has been shown in the literature for the formation factor as follows:

$$F = 1.30\, P^{-1.45}, \quad (2)$$

where $P$ is the porosity expressed as a fraction.

As shown in FIG. 1 the radius of electrode 21 is designated $a$. $x$ indicates the radius of a semi circle shown at 46 which indicates the depth of penetration of the alternating current field surrounding the electrode 21. If $p$ is the sediment resistivity and $R'_s$ is the resistance of a volume of sediment between the radius $a$ and the radius $x$ the following formula may be derived by integration:

$$R'_s = p/2\pi\, (1/a - 1/x) \quad (3)$$

This formula has been derived for the geometry of the arrangement shown in FIG. 1. It should be noted that for the instrument previously referred to the outer diameter of the tubing or electrode 16 is 1 centimeter and the radius $a$ of the electrodes 20 and 21 is 0.5 centimeters.

Figure 4:
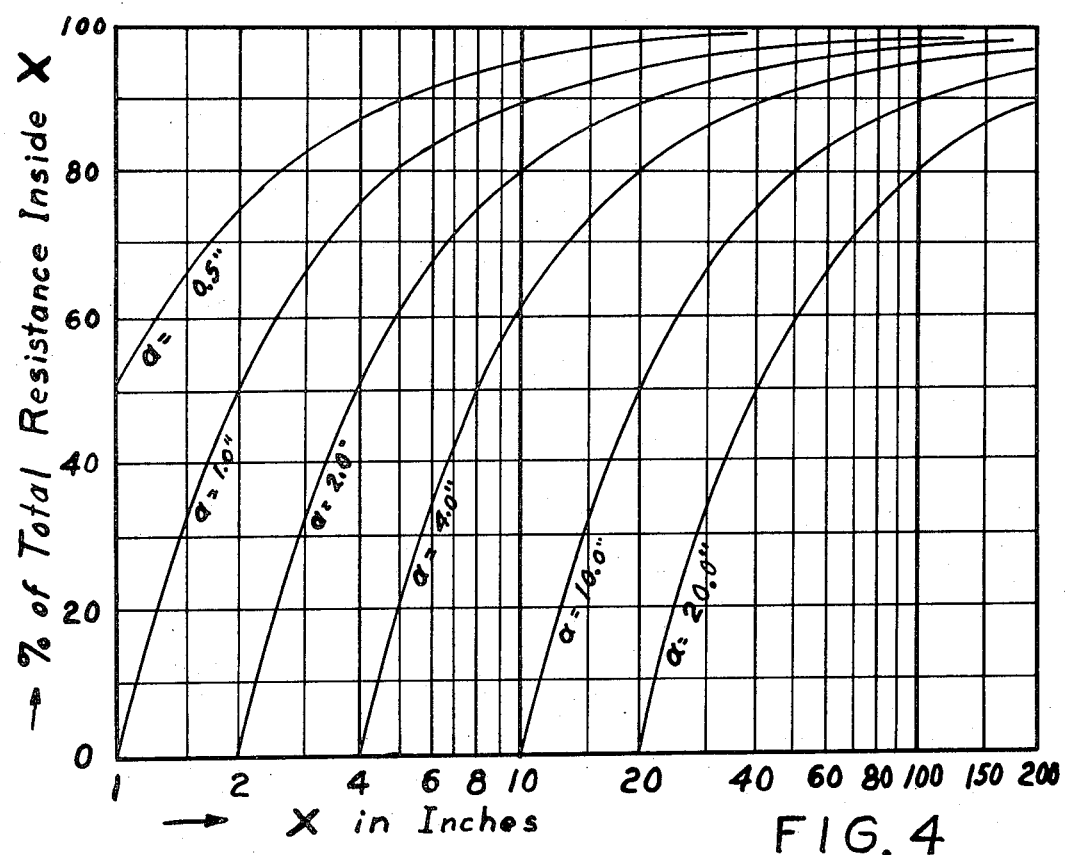
FIG. 4 is a graph illustrating a family of curves showing the relationship between the total resistance of a volume of sediment and the radius of the sediment, each curve being for a different size of electrode of the apparatus.

With this geometry the family of curves of FIG. 4 has been calculated. Here the $x$-axis indicates $x$ in inches and the $y$-axis indicates the percent of the total resistance inside a volume of the radius $x$. FIG. 4 shows a family of curves for different values of $a$, all shown in inches. It should be noted, however, that if both $a$ and $x$ are measured in some other measuring system such as centimeters, the curves are still valid. The top left-hand curve is for the value of a previously given. It shows that 90 percent of the total resistance of the medium in contact with a hemispherical electrode of radius a equal to 0.5 inch occurs with a radius of 5 inches from the electrode center.

The instrument previously described in connection with FIGS. 1 and 2 in particularly adapted for measuring the formation factor in relatively shallow water. Where, however, the water is relatively deep it may be desirable to provide an instrument or electrode arrangement capable of being deep it may be desirable to provide an instrument or electrode arrangement capable of being pulled across the bottom of the water such as a sled. Such an instrument has been shown in FIGS. 5 and 6 to which reference is now made. The instrument includes an electrode arrangement generally indicated at 50. It includes an insulating member or disk 51 of generally U-shape, that is insulating disk 51 has one curved end portion 52 and an opposed substantially straight end portion 53. It is surrounded by a metallic ring or electrode 54 which, however, does not extend across the straight end portion 53. The water-resistance measuring electrode 56 is on one surface of the disk 51 while the sediment-resistance measuring electrode 57 is on the opposite surface of the member or disk 51. The disk 51 has one of its ends 58 tilted upwardly as shown particularly in FIG. 6 to facilitate dragging of the electrode arrangement across the interface 11.

The three electrodes 54, 56 and 57 are connected by suitable leads to an instrument case 60 which preferably includes a self-balancing detector of the type previously indicated. This makes it possible to connect the instrument case 60 by a single insulated cable 61 to a boat or ship shown in FIG. 6 at 62. Thus, the instrument case 60 may include a power source, oscillator and self-balancing detector. The cable 61 includes a single insulated conductor between the sled 50 and the boat 62 for reading out the formation factor which is determined in the manner previously explained.

The electrode 54 may be arranged as a rigid metal frame which serves the purpose to mechanically stabilize the sled 50. The insulating disk 51 may again consist of any of the materials previously described.

There has thus been disclosed an apparatus for and method of measuring in situ the formation factor of sediments. This may be measured directly at the interface of a body of water and the sediment. The instrument includes an electrode arrangement for directly measuring the ratio of the resistance of the sediment filled with water to the resistance of the water. Such measurements are of general interest to fishermen, useful for the preparation of structures or for the location of minerals as a prospecting tool, or for pollution studies. By means of a simple instrument the formation factor may be directly measured at various locations; each measurement can be carried out in less than a minute.

What is claimed is:

1. Apparatus for measuring in situ the formation factor at the interface of a body of water and a sediment comprising:
   a. an insulating member of elongated shape having two opposed, substantially flat surfaces;
   b. a first counter electrode surrounding at least a portion of the circumference of said member and adapted to be in contact with the water and with the sediment;
   c. a second electrode disposed on one surface of said member and adapted to be in contact with the water;
   d. a third electrode disposed on the opposite surface of said member and adapted to be in contact with the sediment to be measured; and
   e. apparatus coupled to said electrodes and including an electronic oscillator for measuring the ratio of the resistance between said first and said third electrode on the one hand and that between said first and second electrode on the other hand, the smallest lateral dimension of said member extending beyond said third electrode being no less than the desired depth of penetration into the sediment of the alternating current generated by said oscillator, thereby to determine directly the formation factor.

2. Apparatus as defined in claim 1 wherein said second and said third electrodes are each of hemispherical shape.

3. Apparatus as defined in claim 1 wherein said second and said third electrodes each project from opposite sides of said member into the water and the sediment respectively.

4. Apparatus as defined in claim 1 wherein said second and third electrodes are substantially flat.

5. Apparatus as defined in claim 1 wherein said insulating member has a conductivity less than that of the water.

6. Apparatus as defined in claim 1 wherein said member is of substantially circular shape.

7. Apparatus as defined in claim 6 wherein said first electrode extends over the entire circumference of said member and is of circular shape.

8. Apparatus as defined in claim 1 wherein said insulating member is of an elongated shape having a curved portion and an opposite flat portion and wherein said first electrode is substantially U-shaped.

9. An electrode arrangement for measuring in situ the formation factor at the interface of a body of water and a sediment comprising:
   a. an elongated, insulating member having two opposed, substantially flat surfaces;
   b. a first counter electrode surrounding at least a portion of the circumference of said member and adapted to be in contact with the water and with the sediment;
   c. a second water-resistance measuring electrode disposed on one surface of said member and adapted to be in contact with the water, and
   d. a third sediment-resistance measuring electrode disposed on the opposite surface of said member and adapted to be in contact with the sediment, said second and third electrodes having substantially identical forms, said member extending beyond said third electrode in all directions by no less than the desired depth of penetration into the sediment of an applied alternating current.

10. An electrode arrangement as defined in claim 9 wherein said second and third electrodes are each substantially of hemispherical shape.

11. An electrode arrangement as defined in claim 9 wherein said second and third electrodes are substantially flat.

12. An electrode arrangement as defined in claim 9 wherein said insulating member has one upturned end portion whereby said electrode arrangement is adapted to be dragged across said interface.

13. The method of measuring in situ the formation factor at the interface of water and a sediment comprising the steps of:
   a. insulating a first predetermined area at the interface of water and the sediment to be measured;
   b. applying a first alternating current between the circumference of the insulated area and a second area small compared to the predetermined area and disposed between the insulated area and the water;
   c. applying a second alternating current between the circumference of the insulated area and a third area small compared to the predetermined area and disposed between the insulated area and the sediment, the distance between the third area and the outer edge of the first area being no less than the desired depth of penetration into the sediment of the second alternating current; and
   d. determining the ratio of the resistances of the sediment and water by determining the ratio of the resistances encountered by the second and first alternating currents, thereby to obtain the formation factor.

* * * * *